(12) United States Patent
Egawa

(10) Patent No.: US 10,168,605 B2
(45) Date of Patent: Jan. 1, 2019

(54) WAVELENGTH CONVERSION DEVICE, ILLUMINATION DEVICE, AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/548,757

(22) PCT Filed: Jan. 20, 2016

(86) PCT No.: PCT/JP2016/000272
§ 371 (c)(1),
(2) Date: Aug. 3, 2017

(87) PCT Pub. No.: WO2016/132673
PCT Pub. Date: Aug. 25, 2016

(65) Prior Publication Data
US 2018/0031957 A1    Feb. 1, 2018

(30) Foreign Application Priority Data

Feb. 17, 2015  (JP) ................................. 2015-028780
Sep. 8, 2015  (JP) ................................. 2015-176552

(51) Int. Cl.
| | |
|---|---|
| *F21V 29/77* | (2015.01) |
| *G03B 21/16* | (2006.01) |
| *G03B 21/20* | (2006.01) |
| *H04N 9/31* | (2006.01) |
| *G02B 26/00* | (2006.01) |

(52) U.S. Cl.
CPC ........... *G03B 21/16* (2013.01); *G02B 26/008* (2013.01); *G03B 21/204* (2013.01); *G03B 21/2066* (2013.01); *H04N 9/3144* (2013.01); *H04N 9/3158* (2013.01)

(58) Field of Classification Search
CPC .. G03B 21/16; G03B 21/204; G03B 21/2066; G02B 26/008
USPC .................................................. 362/84, 294
See application file for complete search history.

(56) References Cited

U.S. PATENT DOCUMENTS

| | | | | |
|---|---|---|---|---|
| 8,337,049 | B2* | 12/2012 | Shida ........................ | F21V 3/02 362/294 |
| 2009/0073591 | A1 | 3/2009 | Chou | |
| 2010/0134043 | A1 | 6/2010 | Kadotani et al. | |

(Continued)

FOREIGN PATENT DOCUMENTS

| | | |
|---|---|---|
| CN | 103226283 A | 7/2013 |
| CN | 203489181 U | 3/2014 |

(Continued)

OTHER PUBLICATIONS

Apr. 26, 2016 International Search Report issued in International Patent Application No. PCT/JP2016/000272.

(Continued)

*Primary Examiner* — Karl D Frech
(74) *Attorney, Agent, or Firm* — Oliff PLC

(57) ABSTRACT

A wavelength conversion device includes a substrate having a first surface and a second surface, a wavelength conversion element provided on the first surface, and a heat sink provided on the second surface separately from the substrate.

16 Claims, 6 Drawing Sheets

(56) References Cited

U.S. PATENT DOCUMENTS

| | | | |
|---|---|---|---|
| 2013/0221826 A1 | 8/2013 | Okumura | |
| 2014/0042467 A1* | 2/2014 | Livesay | H01L 33/642 |
| | | | 257/88 |
| 2014/0354960 A1 | 12/2014 | Miyazaki | |

FOREIGN PATENT DOCUMENTS

| | | |
|---|---|---|
| JP | 2004-279550 A | 10/2004 |
| JP | 2009-075588 A | 4/2009 |
| JP | 2012-013897 A | 1/2012 |
| JP | 2013-109283 A | 6/2013 |
| JP | 2014-165058 A | 9/2014 |
| JP | 2014-212085 A | 11/2014 |
| JP | 2015-007751 A | 1/2015 |
| WO | 2012/039168 A1 | 3/2012 |

OTHER PUBLICATIONS

Aug. 30, 2018 Search Report issued in European Patent Application No. 16752066.7.

* cited by examiner

[Fig. 1]
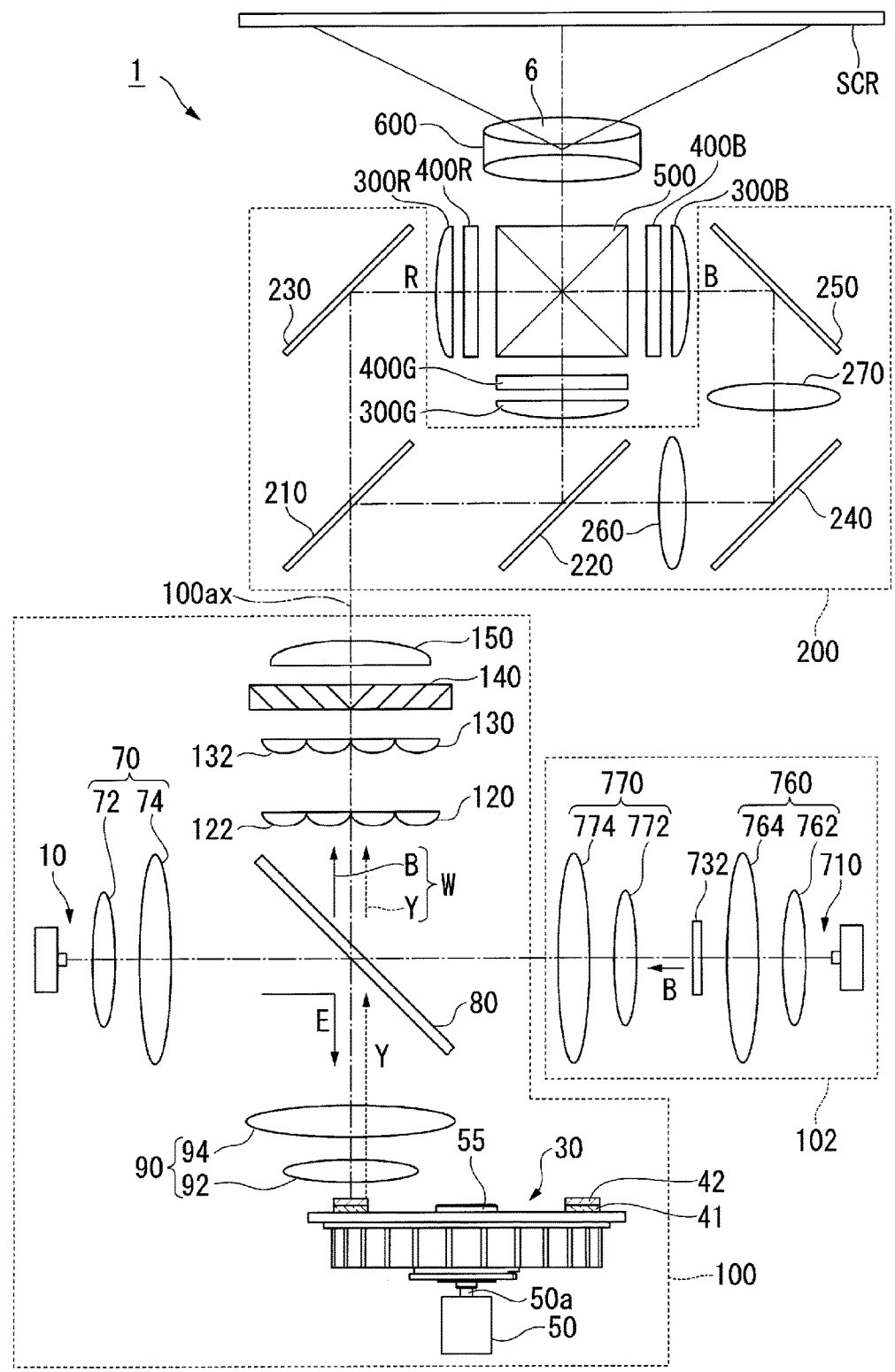

[Fig. 2A]
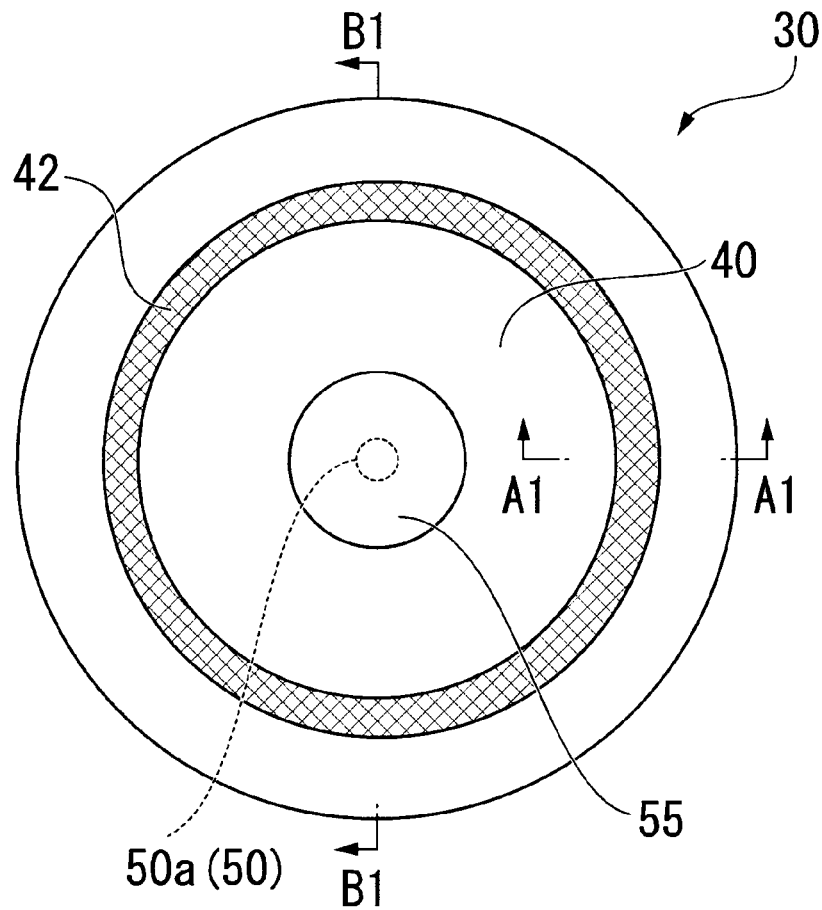
[Fig. 2B]
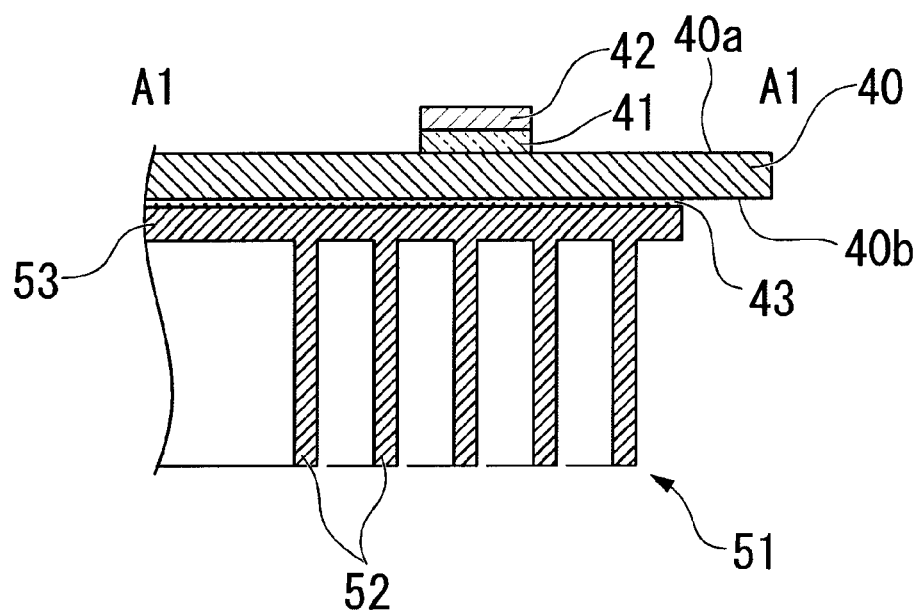

[Fig. 3A]
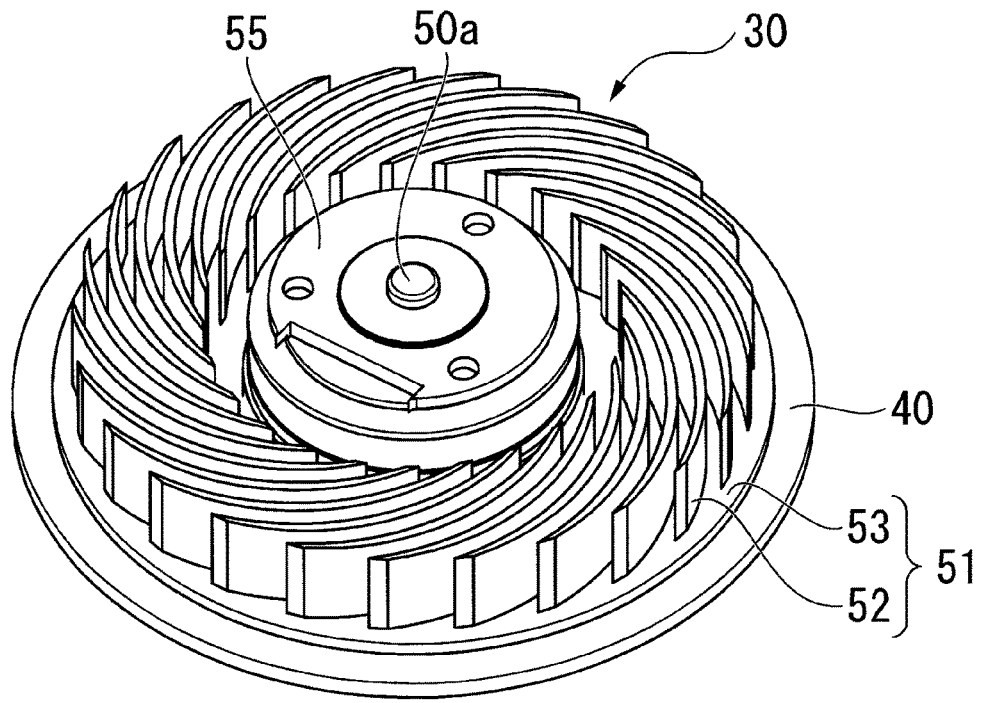
[Fig. 3B]
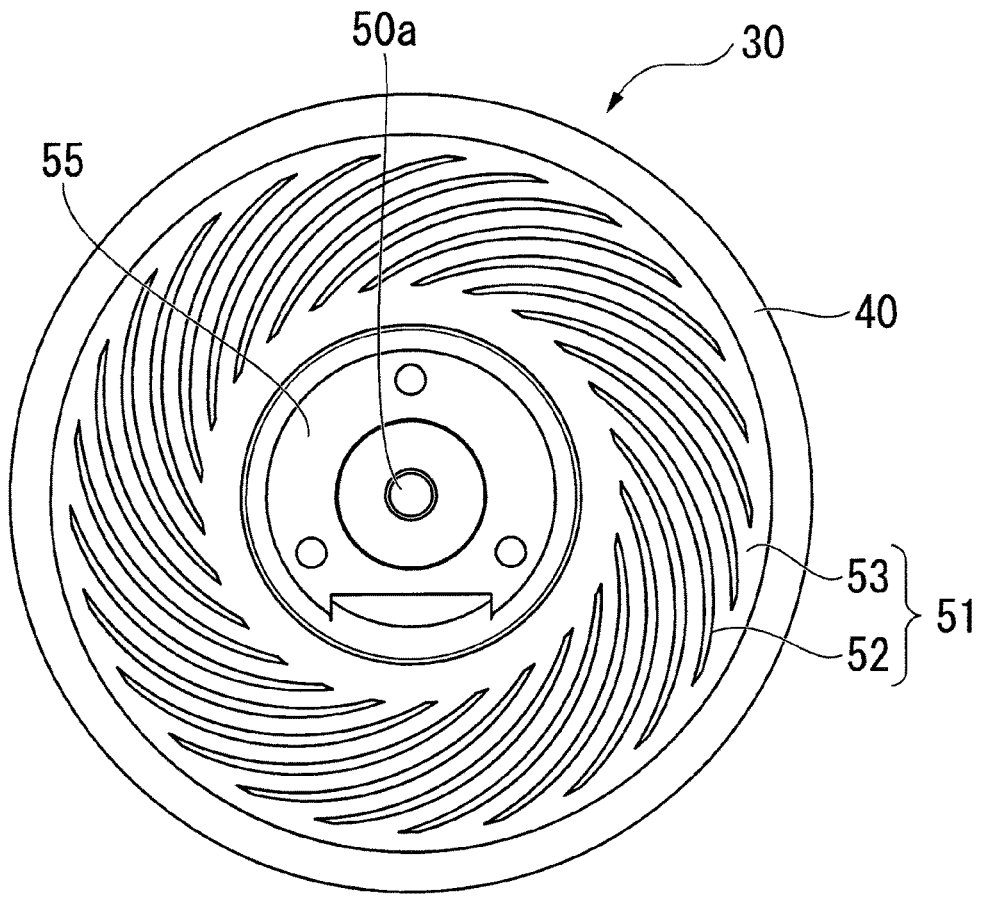

[Fig. 4]
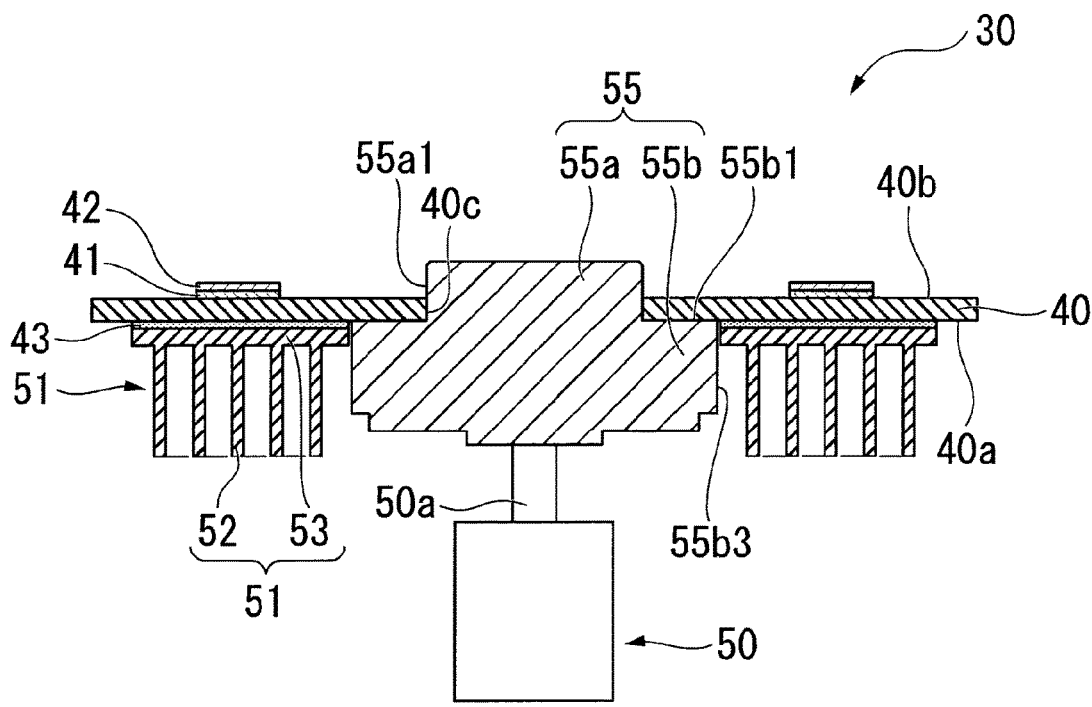
[Fig. 5]
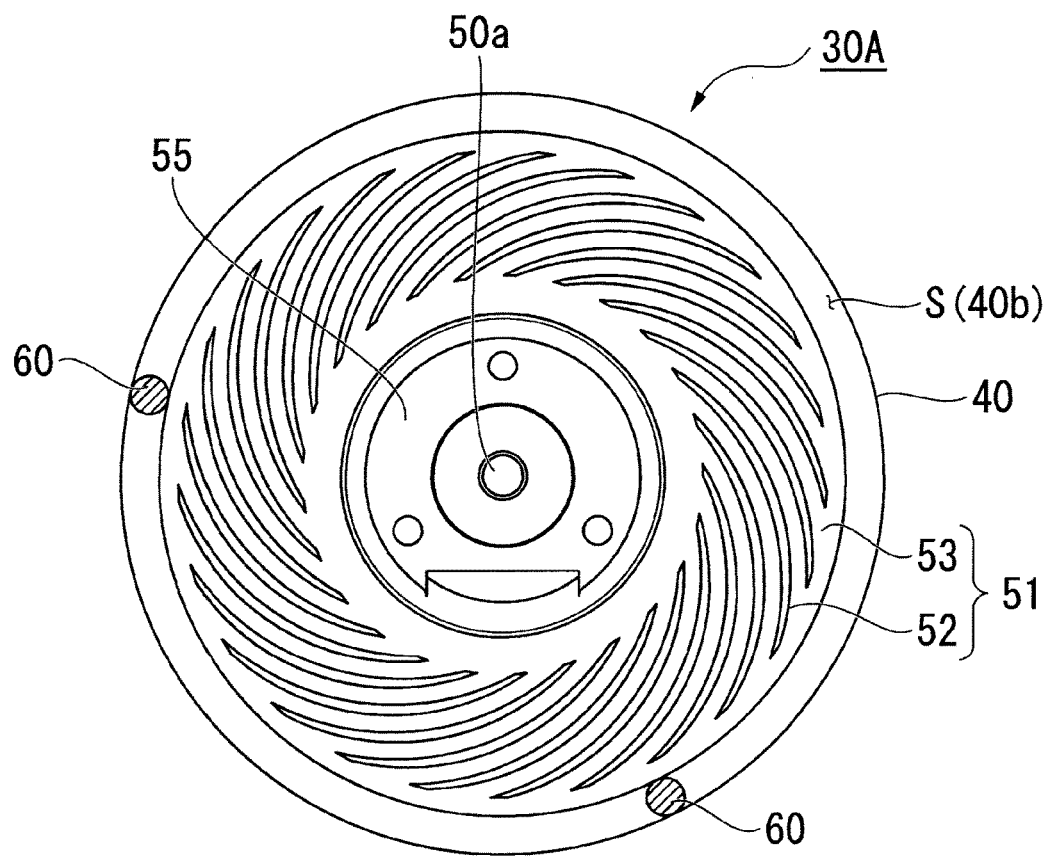

[Fig. 6]
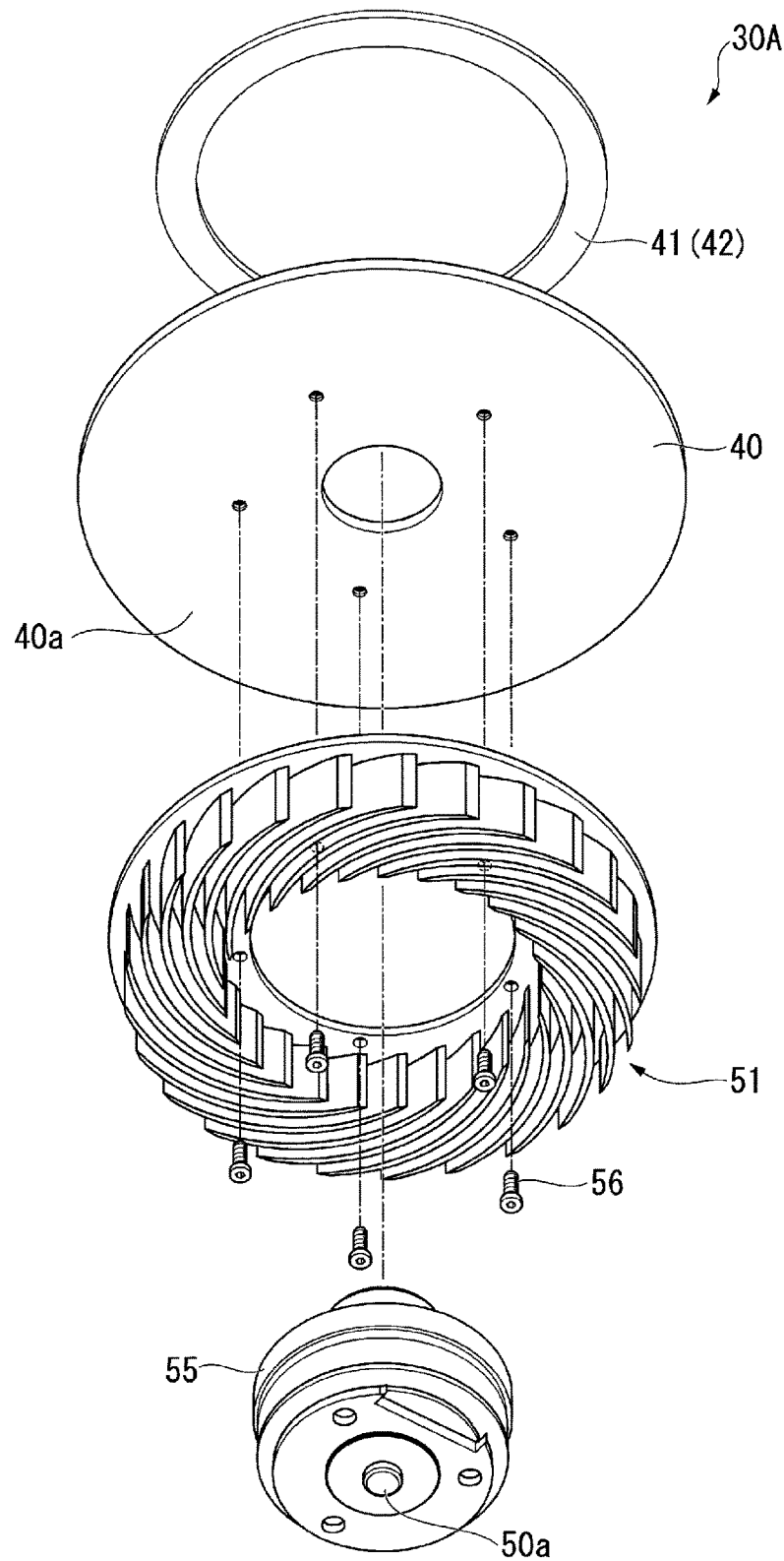

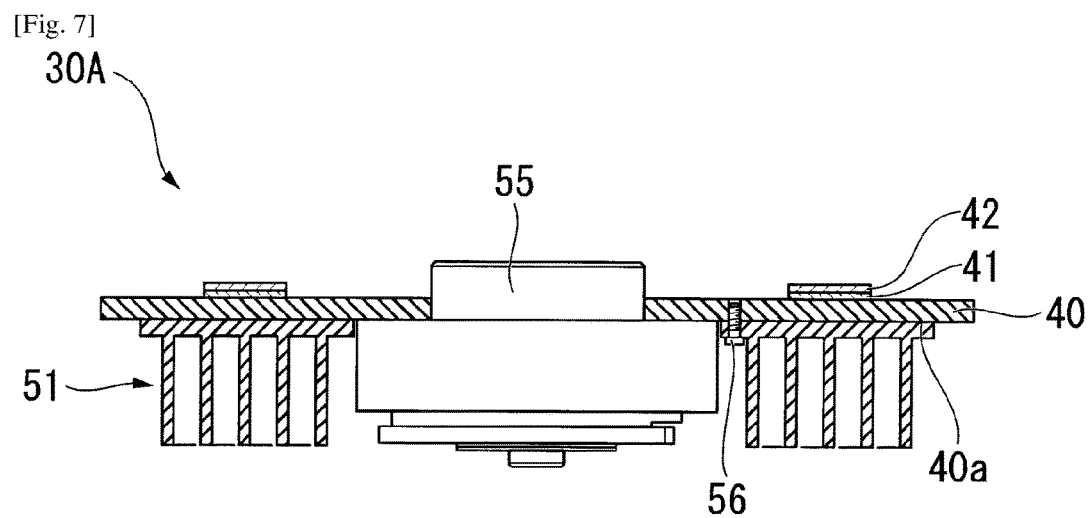
[Fig. 7]

WAVELENGTH CONVERSION DEVICE, ILLUMINATION DEVICE, AND PROJECTOR

TECHNICAL FIELD

The present invention relates to a wavelength conversion device, an illumination device, and a projector.

RELATED ART

In recent years, a phosphor is used as an illumination device for a projector.

In an illumination device of Patent Literature 1 described below, cooling fins are provided on the rear surface of a substrate that supports a phosphor. The substrate and the cooling fins are integrally formed.

CITATION LIST

Patent Literature

PTL 1: JP-A-2012-13897

SUMMARY OF INVENTION

Technical Problem

Incidentally, a reflection film that reflects fluorescent light needs to be formed on the substrate. Therefore, a surface for supporting the phosphor of the substrate has been required of highly accurate surface roughness. Further, because of necessity for accurately disposing a phosphor layer, the substrate has been required of high flatness as well.

When the substrate and the cooling fins are integrally formed, a manufacturing method such as die-cast has to be adopted. Therefore, secondary machining such as polishing is necessary to obtain necessary surface roughness and flatness. Thus, there is a problem in that costs increase.

An advantage of some aspects of the invention is to provide a wavelength conversion device, an illumination device, and a projector that can realize a reduction in costs.

Solution to Problem

According to a first aspect of the invention, there is provided a wavelength conversion device including: a substrate having a first surface and a second surface; a wavelength conversion element provided on the first surface; and a heat sink provided on the second surface separately from the substrate.

With the wavelength conversion device according to the first aspect, since the substrate and the heat sink are separate, it is unnecessary to manufacture the substrate and the heat sink using die-cast. Therefore, manufacturing costs are reduced. It is possible to provide the wavelength conversion device for which a cost reduction is achieved.

In the first aspect, a low heat resistance member that decreases heat resistance between the substrate and the heat sink may be provided between the substrate and the heat sink.

With this configuration, heat of the substrate is efficiently transmitted to the heat sink side by the low heat resistance member. Therefore, it is possible to suppress a temperature rise of the substrate and the wavelength conversion element provided on the substrate.

In the first aspect, the heat sink may include a flat plate and a plurality of fins, and the flat plate may be in surface contact with the second surface of the substrate.

With this configuration, the flat plate is in contact with the second surface in as large an area as possible because the flat plate is in surface contact with the second surface. Therefore, heat of the substrate is efficiently transmitted to the flat plate side. The plurality of fins can efficiently radiate heat of the flat plate.

In the first aspect, the outer diameter of the plurality of fins may be smaller than the outer diameter of the substrate. The wavelength conversion device preferably further includes a balance adjustment member provided in an outer circumferential portion of the plurality of fins.

With this configuration, it is possible to secure a space for disposing the balance adjustment member in the outer circumferential portion of the plurality of fins. By providing the balance adjustment member in the space, for example, even when the substrate is rotated, it is possible to suppress a wobble that occurs in the substrate.

In the first aspect, the heat sink may be fixed to the substrate by a fixing member.

With this configuration, assembly work of the device is facilitated. Since the heat sink is firmly fixed to the substrate by the fixing member, it is possible to suppress occurrence of a wobble involved in rotation of a rotating shaft.

In the first aspect, the wavelength conversion device may further include a rotating device configured to rotate the substrate around a rotating shaft.

With this configuration, it is possible to efficiently cool the wavelength conversion element.

In the first aspect, the rotating device may be disposed on the second surface side of the substrate.

With this configuration, the rotating device is disposed on a surface on the same side as the heat sink with respect to the substrate. Therefore, it is possible to cool the rotating device with the heat sink.

In the first aspect, the rotating shaft may include a hub, and the substrate and the heat sink may be fit in the hub. The heat sink is preferably fit in the hub.

With this configuration, since the substrate and the heat sink are fit in the hub, assembly work of the device is facilitated. Since the substrate and the heat sink are surely fixed via the hub, it is possible to suppress occurrence of a wobble involved in the rotation of the rotating shaft.

According to a second aspect of the invention, there is provided an illumination device including: a light source configured to emit light in a first wavelength band; and the wavelength conversion device according to the first aspect configured to receive the light in the first wavelength band and emit light in a second wavelength band.

The illumination device according to the second aspect includes the wavelength conversion device for which a cost reduction is achieved. Therefore, it is possible to generate bright illumination light at low costs.

In the second aspect, the light in the first wavelength band may be made incident on the first surface, and the light in the second wavelength band may be emitted from the first surface.

With this configuration, it is possible to realize the illumination device including the wavelength conversion device of a light reflection type.

According to a third aspect of the invention, there is provided a projector including: the illumination device according to the second aspect; a light modulation device configured to modulate, according to image information, illumination light emitted from the illumination device to thereby form image light; and a projection optical system configured to project the image light.

The projector according to the third aspect includes the illumination device according to the second aspect. Therefore, it is possible to perform display that is bright and excellent in image quality.

BRIEF DESCRIPTION OF DRAWINGS

FIG. 1 is a block diagram showing the configuration of an optical system of a projector according to a first aspect.

FIG. 2A is a diagram shown to explain a rotating fluorescent plate.

FIG. 2B is a diagram shown to explain a rotating fluorescent plate.

FIG. 3A is a diagram showing the schematic configuration of a heat sink.

FIG. 3B is a diagram showing the schematic configuration of a heat sink.

FIG. 4 is a main part sectional view of the rotating fluorescent plate.

FIG. 5 is a plan view showing the configuration of a rotating fluorescent plate according to a second embodiment.

FIG. 6 is an exploded perspective view showing the structure of a rotating fluorescent plate according to a modification.

FIG. 7 is a sectional view showing the structure of a rotating fluorescent plate according to a modification.

DESCRIPTION OF EMBODIMENTS

Embodiments of the invention are explained in detail below with reference to the drawings.

Note that, in the drawings used in the following explanation, characteristic portions are sometimes shown in enlargement for convenience in order to clearly show characteristics. Dimension ratios and the like of components are not always the same as actual dimension ratios and the like.

First Embodiment

An example of a projector according to a first embodiment is explained. The projector in this embodiment is a projection-type image display device that displays a color video on a screen (projection surface) SCR.

FIG. 1 is a top view showing an optical system of the projector according to this embodiment.

A projector 1 includes, as shown in FIG. 1, a first illumination device 100, a second illumination device 102, a color-separation/light-guide optical system 200, liquid-crystal light modulation devices 400R, 400G, and 400B corresponding to color lights of red light, green light, and blue light, a cross dichroic prism 500, and a projection optical system 600.

The first illumination device 100 includes a first light source 10, a collimate optical system 70, a dichroic mirror 80, a collimate condensing optical system 90, a rotating fluorescent plate (a wavelength conversion device) 30, a first lens array 120, a second lens array 130, a polarization conversion element 140, and a superimposing lens 150.

The first light source 10 includes a semiconductor laser (a light emitting element) that emits blue light (a peak of light emission intensity: approximately 445 nm) E in a first wavelength band formed as excitation light by laser light. The first light source 10 may include one semiconductor laser or may include a large number of semiconductor lasers.

Note that, as the first light source 10, a semiconductor laser that emits blue light having wavelength (e.g., 460 nm) other than 445 nm can be used.

In this embodiment, the first light source 10 is disposed such that an optical axis of the first light source 10 is orthogonal to an illumination optical axis 100ax.

The collimate optical system 70 includes a first lens 72 and a second lens 74 and substantially parallelizes light emitted from the first light source 10. The first lens 72 and the second lens 74 are made of convex lenses.

The dichroic mirror 80 is disposed in an optical path from the collimate optical system 70 to a collimate condensing system 90 to cross the optical axis of the first light source 10 and the illumination optical axis 100ax at an angle of 45°. The dichroic mirror 80 reflects blue light and allows yellow fluorescent light including red light and green light to pass.

The collimate condensing optical system 90 has a function of making blue light E emitted from the dichroic mirror 80 incident on a phosphor layer 42 of the rotating fluorescent plate 30 in a state in which the blue light E is substantially condensed and a function of substantially parallelizing fluorescent light emitted from the rotating fluorescent plate 30. The collimate condensing optical system 90 includes a first lens 92 and a second lens 94. The first lens 92 and the second lens 94 are made of convex lenses.

The second illumination device 102 includes a second light source 710, a condensing optical system 760, a scattering plate 732, and a collimate optical system 770.

The second light source 710 is configured from a semiconductor laser same as the first light source 10 of the first illumination device 100.

The condensing optical system 760 includes a first lens 762 and a second lens 764. The condensing optical system 760 condenses, near the scattering plate 732, blue light B emitted from the second light source 710. The first lens 762 and the second lens 764 are made of convex lenses.

The scattering plate 732 scatters the blue light B emitted from the second light source 710 and changes the blue light B to the blue light B having a light distribution similar to a light distribution of fluorescent light Y emitted from the rotating fluorescent plate 30. As the scattering plate 732, for example, frosted glass made of optical glass can be used.

The collimate optical system 770 includes a first lens 772 and a second lens 774 and substantially parallelizes light emitted from the scattering plate 732. The first lens 772 and the second lens 774 are made of convex lenses.

In this embodiment, the blue light B emitted from the second illumination device 102 is reflected by the dichroic mirror 80 and combined with the fluorescent light Y, which is emitted from the rotating fluorescent plate 30 and transmitted through the dichroic mirror 80, to change to white light W. The white light W is made incident on the first lens array 120.

FIGS. 2A and 2B are diagrams shown to explain the rotating fluorescent plate according to the embodiment. FIG. 2A is a front view of the rotating fluorescent plate 30. FIG. 2B is an A1-A1 sectional view of FIG. 2A.

The rotating fluorescent plate 30 includes, as shown in FIGS. 1 and 2, a motor (a rotating device) 50, a disk (a substrate) 40, a reflection film 41, the phosphor layer (a wavelength conversion layer) 42, and a heat sink 51.

The disk 40 is rotatable by the motor 50. The phosphor layer 42 is provided along the circumferential direction of an upper surface (a first surface) 40a of the disk 40. The heat sink 51 is provided on a lower surface (a second surface) 40b of the disk 40.

The motor 50 includes a rotating shaft 50a and a hub 55. One end side of the hub 55 is attached to the rotating shaft 50a and is rotatable together with the rotating shaft 50a. The motor 50 is disposed on the lower surface 40b side of the disk 40.

In this embodiment, the reflection film 41 and the phosphor layer 42 have a ring shape. The rotating fluorescent plate 30 emits the fluorescent light Y toward a side same as a side on which the blue light E is made incident.

The disk 40 is configured from, for example, a disk made of metal excellent in a heat radiation property such as aluminum or copper.

The phosphor layer 42 is excited by the blue light E emitted from the first light source 10 and emits the fluorescent light Y in a second wavelength band. A surface of the phosphor layer 42 on which the blue light E is made incident is also an emission surface from which the fluorescent light Y is emitted. The fluorescent light Y is yellow light including red light and green light. The phosphor layer 42 is formed by, for example, a layer containing (Y, Gd)3(Al, Ga)5012: Ce, which is a YAG phosphor.

The reflection film 41 is provided between the phosphor layer 42 and the disk 40 and designed to reflect the fluorescent light Y at high efficiency. In order to satisfactorily form the reflection film 41 having a desired characteristic, the upper surface 40a of the disk 40 needs to have highly accurate surface roughness. That is, the surface roughness needs to be controlled to be within a predetermined range. In this embodiment, since the reflection film 41 is formed on the upper surface 40a having the highly accurate surface roughness, it is possible to satisfactorily reflect most of the fluorescent light Y, which travels toward the disk 40 side, toward the upper direction in FIG. 2B (the opposite side of the disk 40).

In this embodiment, since the blue light E formed by the laser light is made incident on the phosphor layer 42, heat is generated in the phosphor layer 42. In this embodiment, by rotating the disk 40, an incident position of the blue light E on the phosphor layer 42 is sequentially changed. This prevents occurrence of a deficiency such as deterioration of the phosphor layer 42 caused by concentrated irradiation of the blue light E on the same portion.

In this embodiment, heat of the phosphor layer 42 is transmitted to the heat sink 51 separate from the disk 40 via the disk 40 to efficiently radiate the heat of the phosphor layer 42.

Incidentally, in this embodiment, the heat sink 51 is configured separately from the disk 40. Usually, when the heat sink 51 and the disk 40 are integrated, the heat sink 51 and the disk 40 need to be manufactured by die-cast or the like. Therefore, in order to obtain necessary surface roughness and flatness in the disk 40, secondary machining such as polishing is necessary. It is likely that costs are extremely high.

In this embodiment, since the rotating fluorescent plate 30 includes the heat sink 51 separate from the disk 40 as explained above, it is unnecessary to manufacture the disk 40 and the heat sink 51 using the die-cast or the like. Therefore, in the rotating fluorescent plate 30 in this embodiment, manufacturing costs are suppressed and a reduction in costs is achieved.

Further, in this embodiment, heat conductive grease (a low heat resistance member) 43 is disposed between the heat sink 51 and the disk 40 (see FIG. 2B). The heat conductive grease 43 is configured from, for example, grease containing a heat conductive filler. The heat conductive grease 43 decreases heat resistance between the disk 40 and the heat sink 51. Consequently, the heat conductive grease 43 can efficiently transmit the heat of the phosphor layer 42 provided on the disk 40 to the heat sink 51 side.

Note that the heat conductive grease 43 may have a function of an adhesive that bonds the heat sink 51 and the disk 40. Consequently, it is possible to firmly fix the heat sink 51 and the disk 40.

FIGS. 3A and 3B are diagrams showing the schematic configuration of the heat sink 51. FIG. 3A is a perspective view showing the structure of the heat sink 51. FIG. 3B is a plan view showing the configuration of the heat sink 51.

The heat sink 51 is configured from, for example, a metal material excellent in a heat radiation property such as aluminum or copper. The heat sink 51 includes, as shown in FIG. 2B and FIGS. 3A and 3B, a plurality of fins 52 and a flat plate 53.

The plurality of fins 52 are formed integrally with the flat plate 53. As shown in FIGS. 3A and 3B, the plurality of fins 52 are disposed to surround the hub 55. As shown in FIG. 3B, in a plan view state, the plurality of fins 52 are configured from projecting members curved to be formed in a swirl shape from the radial direction outer side toward the inner side of the disk 40. The fins 52 configured from the projecting members can reduce air resistance that occurs during rotation of the disk 40.

As shown in FIG. 3B, in a plan view state, the plurality of fins 52 are disposed to overlap the phosphor layer 42 provided on the upper surface of the disk 40. Since the plurality of fins 52 are disposed in this way, the heat of the phosphor layer 42 is transmitted to the plurality of fins 52 through a route having low heat resistance (short distance). In other words, it is possible to efficiently transmit the heat of the phosphor layer 42 provided on the disk 40 to the plurality of fins 52.

When the disk 40 including the plurality of fins 52 rotates, a flow of the air along the surfaces of the fins 52 occurs to move from the radial direction inner side toward the outer side of the disk 40. The plurality of fins 52 are cooled by the flow of the air, whereby the heat of the disk 40 can be radiated.

FIG. 4 is a B1-B1 sectional view of FIG. 2A and is a main part sectional view of the rotating fluorescent plate 30. As shown in FIG. 4, the other end side of the hub 55 is fit in attachment holes respectively provided in the disk 40 and the heat sink 51. In this embodiment, the hub 55 functions as a fixing member that fixes the disk 40 and the heat sink 51. By using the hub 55 as the fixing member in this way, assembly work of the rotating fluorescent plate 30 is facilitated.

The hub 55 includes a first shaft section 55a and a second shaft section 55b. The outer diameter of the first shaft section 55a is smaller than the outer diameter of the second shaft section 55b. The first shaft section 55a and the second shaft section 55b are respectively formed by columnar members and are integrally formed with each other.

An outer circumferential surface section 55a1 of the first shaft section 55a is fit in a through-hole 40c provided in the disk 40. Consequently, the disk 40 is highly accurately positioned with respect to the rotating shaft 50a of the motor 50 via the hub 55 (the first shaft section 55a).

The second shaft section 55b includes a first surface 55b1 provided with the first shaft section 55a and formed by a flat surface and an outer circumferential surface section 55b3. The first shaft section 55a and the second shaft section 55b are formed in a concentric axis structure having the same center axis.

In the second shaft section 55b, the first surface 55b1 is in contact with the lower surface 40b of the disk 40. The first surface 55b1 is perpendicular to the rotating shaft 50a. Therefore, when the first surface 55b1 is in contact with the lower surface 40b, the disk 40 is disposed in a state perpendicular to the rotating shaft 50a.

Note that the heat conductive grease 43 may be disposed between the first surface 55b1 and the lower surface 40b. Alternatively, when the flatness of contact surfaces of the first surface 55b1 and the lower surface 40b is high, the first surface 55b1 and the lower surface 40b may be directly set in surface contact with each other.

The outer circumferential surface section 55b3 of the second shaft section 55b is fit in a through-hole 53a provided in the flat plate 53 of the heat sink 51. Consequently, the heat sink 51 is highly accurately positioned with respect to the rotating shaft 50a of the motor 50 via the hub 55 (the second shaft section 55b).

According to this embodiment, the disk 40 and the heat sink 51 are accurately disposed with respect to the rotating shaft 50a via the hub 55. Therefore, it is possible to reduce occurrence of deviation of a rotation balance. In this embodiment, the first surface 55b1 of the second shaft section 55b (the hub 55) and the disk 40 are in surface contact with each other. The heat sink 51 and the rotating shaft 50a of the motor 50 are accurately positioned. Therefore, it is possible to suppress occurrence of a wobble involved in rotation of the rotating shaft 50a.

In this embodiment, the motor 50 is disposed on a surface on the same side as the heat sink 51 with respect to the disk 40. Therefore, the air generated from the radial direction inner side toward the outer side of the disk 40 according to rotation of the plurality of fins 52 can cool the motor 50. Therefore, the heat sink 51 can perform cooling of the motor 50 in addition to the disk 40.

Referring back to FIG. 1, the first lens array 120 includes a plurality of first small lenses 122 for dividing light emitted from the dichroic mirror 80 into a plurality of partial light beams. The plurality of first small lenses 122 are arrayed in a matrix shape in a surface orthogonal to the illumination optical axis 100ax.

The second lens array 130 includes a plurality of second small lenses 132 corresponding to the plurality of first small lenses 122 of the first lens array 120. The second lens array 130 forms, in conjunction with the superimposing lens 150, images of the first small lenses 122 of the first lens array 120 in the vicinities of image forming regions of the liquid-crystal light modulation devices 400R, 400G, and 400B of the first small lenses 122 of the first lens array 120. The plurality of second small lenses 132 are arrayed in a matrix shape in the surface orthogonal to the illumination optical axis 100ax.

The polarization conversion element 140 converts the partial light beams divided by the first lens array 120 into linearly polarized light. The polarization conversion element 140 includes a polarization separation layer, a reflection layer, and a phase difference plate. The polarization separation layer directly transmits one linear polarization component of polarization components included in light emitted from the rotating fluorescent plate 30 and reflects the other linear polarization component toward the reflection layer. The reflection layer reflects the other linear polarization component, which is reflected by the polarization separation layer, in a direction parallel to the illumination optical axis 100ax. The phase difference plate converts the other linear polarization component reflected by the reflection layer into one linear polarization component.

The superimposing lens 150 condenses the partial light beams emitted from the polarization conversion element 140 and superimposes the partial light beams one another in the vicinities of the image forming regions of the liquid-crystal light modulation devices 400R, 400G, and 400B. The first lens array 120, the second lens array 130, and the superimposing lens 150 configure an integrator optical system that equalizes an in-plane light intensity distribution of light emitted from the rotating fluorescent plate 30.

The color-separation/light-guide optical system 200 includes dichroic mirrors 210 and 220, reflection mirrors 230, 240, and 250, and relay lenses 260 and 270. The color-separation/light-guide optical system 200 separates the white light W emitted from the first illumination device 100 and the second illumination device 102 into the red light R, the green light G, and the blue light B and guides the red light R, the green light G, and the blue light B to the liquid-crystal light modulation devices 400R, 400G, and 400B respectively corresponding thereto.

Field lenses 300R, 300G, and 300B are disposed between the color-separation/light-guide optical system 200 and the liquid-crystal light modulation devices 400R, 400G, and 400B.

The dichroic mirror 210 is a dichroic mirror that allows a red light component to pass and reflects a green light component and a blue light component.

The dichroic mirror 220 is a dichroic mirror that reflects the green light component and allows the blue light component to pass.

The reflection mirror 230 is a reflection mirror that reflects the red light component.

The reflection mirrors 240 and 250 are reflection mirrors that reflect the blue light component.

The red light passed through the dichroic mirror 210 is reflected by the reflection mirror 230, passes through the field lens 300R, and is made incident on the image forming region of the liquid-crystal light modulation device 400R for red light.

The green light reflected by the dichroic mirror 210 is further reflected by the dichroic mirror 220, passes through the field lens 300G, and is made incident on the image forming region of the liquid-crystal light modulation device 400G for green light.

The blue light passed through the dichroic mirror 220 is made incident on the image forming region of the liquid-crystal light modulation device 400B for blue light through the relay lens 260, the reflection mirror 240 on an incidence side, the relay lens 270, the reflection mirror 250 on an emission side, and the field lens 300B.

The liquid-crystal light modulation devices 400R, 400G, and 400B respectively modulate the incident color lights according to image information and form images corresponding to the color lights. Note that, although not shown in the figure, incidence-side polarizing plates are respectively disposed between the field lenses 300R, 300G, and 300B and the liquid-crystal light modulation devices 400R, 400G, and 400B. Emission-side polarizing plates are respectively disposed between the liquid-crystal light modulation devices 400R, 400G, and 400B and the cross dichroic prism 500.

The cross dichroic prism 500 is an optical element that combines image lights emitted from the liquid-crystal light modulation devices 400R, 400G, and 400B and forms a color image.

The cross dichroic prism 500 is formed in a substantially square shape in plan view obtained by sticking together four right-angle prisms. A dielectric multilayer film is formed on a substantially X-shaped interface of the stuck right-angle prisms.

The color image emitted from the cross dichroic prism 500 is enlarged and projected by the projection optical system 600 and forms an image on the screen SCR.

As explained above, according to this embodiment, the disk 40 and the heat sink 51 are separately configured. Therefore, it is possible to realize a reduction in the costs of the rotating fluorescent plate 30. The phosphor layer 42 is excellent in a heat radiation property. Therefore, the first illumination device 100 including the rotating fluorescent plate 30 has high reliability and can generate bright illumination light (the white light W) at low costs. The projector 1 including the first illumination device 100 can display an image excellent in quality at low costs.

Second Embodiment

A second embodiment of the invention is explained. A difference between this embodiment and the first embodiment is the configuration of a rotating fluorescent plate. The other components are common. In the following explanation, components and members common to the first embodiment are denoted by the same reference numerals and signs. Detailed explanation of the components and the members is omitted.

FIG. 5 is a plan view showing the configuration of the rotating fluorescent plate in this embodiment.

As shown in FIG. 5, in a rotating fluorescent plate 30A in this embodiment, the outer diameter of the plurality of fins 52 is smaller than the outer diameter of the disk 40. Therefore, a ring-like space S is formed in an outer circumferential portion of the fins 52, that is, an outer circumferential portion of the lower surface 40b of the disk 40.

Incidentally, in the rotating fluorescent plate 30A, when the shape of the fins 52 configuring the heat sink 51 is complicated, it is highly likely that deviation occurs in a rotation balance.

On the other hand, in this embodiment, balance adjustment members 60 are disposed in the space S. The balance adjustment members 60 are members for adjusting a rotation balance of the disk 40. The balance adjustment members 60 are configured by, for example, applying an adhesive. With this configuration, it is possible to simply and accurately adjust a rotation balance of the disk 40 by adjusting an applying position and an application amount of the adhesive. The space S is present on the outer circumference side of the fins 52. Therefore, compared with when the adhesive is applied to the inner circumference side of the fins 52, it is possible to sufficiently adjust the rotation balance of the disk 40 even with a small amount of the adhesive. Note that a constituent member of the balance adjustment members 60 is not limited to only the adhesive. For example, a metal member having predetermined weight may be used as the balance adjustment members 60.

In the embodiments, the example is explained in which the outer diameter of the flat plate 53 of the heat sink 51 is smaller than the outer diameter of the disk 40. However, the invention is not limited to this. In the invention, the outer diameter of the plurality of fins 52 only has to be smaller than the outer diameter of the disk 40. For example, the outer diameter of the flat plate 53 may be the same size as the outer diameter of the disk 40. In this case, the balance adjustment members 60 only have to be disposed in the outer circumferential portion of the plurality of fins 52, that is, an outer circumferential portion of the flat plate 53.

Note that the invention is not always limited to the embodiments and can be variously changed without departing from the spirit of the invention.

For example, in the first embodiment, the example is explained in which the heat conductive grease 43 is disposed between the disk 40 and the heat sink 51. However, the invention is not limited to this. For example, when the flatness of the contact surfaces of the flat plate 53 of the heat sink 51 and the disk 40 is high, the flat plate 53 and the lower surface 40b of the disk 40 may be set in surface contact with each other.

FIG. 6 is an exploded perspective view of the flat plate 53 and the disk 40 set in contact with each other. FIG. 7 is a sectional configuration diagram of the flat plate 53 and the disk 40 set in contact with each other.

As shown in FIGS. 6 and 7, the heat sink 51 is fixed to the disk 40 by, for example, screw members (fixing members) 56. Consequently, the flat plate 53 and the disk 40 are firmly fixed in a state in which the flat plate 53 and the disk 40 are in contact with each other in a wide area. Therefore, heat is efficiently transmitted from the disk 40 to the heat sink 51 (the flat plate 53). A high heat radiation property can be obtained. The heat sink 51 is firmly fixed to the disk 40 by the screw members 56. Therefore, it is possible to suppress occurrence of a wobble involved in the rotation of the rotating shaft 50a.

In the embodiments, the disk 40 functioning as the substrate is configured rotatably around the rotating shaft 50a. However, the invention is not limited to this. It is not always necessary to rotatably configure the substrate.

In the embodiments, the projector 1 including the three liquid-crystal light modulation devices 400R, 400G, and 400B is illustrated. However, the invention can also be applied to a projector that displays a color video with one liquid-crystal modulation device. A digital mirror device may be used as the light modulation device.

In the embodiments, the example is explained in which the illumination device according to the invention is mounted on the projector. However, the invention is not limited to this. The illumination device according to the invention can also be applied to lighting fixtures, headlights of an automobile, and the like.

The entire disclosure of Japanese Patent Applications No. 2015-28780, filed Feb. 17, 2015 and No. 2015-176552, filed on Sep. 8, 2015 are expressly incorporated by reference herein.

The invention claimed is:

1. A wavelength conversion device comprising:
    a substrate having a first surface and a second surface;
    a wavelength conversion element provided on the first surface;
    a heat sink provided on the second surface separately from the substrate; and
    a rotating device configured to rotate the substrate around a rotating shaft.

2. The wavelength conversion device according to claim 1, wherein a low heat resistance member that decreases heat resistance between the substrate and the heat sink is provided between the substrate and the heat sink.

3. The wavelength conversion device according to claim 1, wherein the heat sink is fixed to the substrate by a fixing member.

4. The wavelength conversion device according to claim 1, wherein the rotating device is disposed on the second surface side of the substrate.

5. The wavelength conversion device according to claim 1, wherein the rotating shaft includes a hub, and
the substrate is fit in the hub.

6. The wavelength conversion device according to claim 5, wherein the heat sink is fit in the hub.

7. An illumination device comprising:
a light source configured to emit light in a first wavelength band; and
the wavelength conversion device according to claim 1 configured to receive the light in the first wavelength band and emit light in a second wavelength band.

8. The illumination device according to claim 7, wherein the light in the first wavelength band is made incident on the first surface, and the light in the second wavelength band is emitted from the first surface.

9. A projector comprising:
the illumination device according to claim 7;
a light modulation device configured to modulate, according to image information, illumination light emitted from the illumination device to thereby form image light; and
a projection optical system configured to project the image light.

10. A wavelength conversion device comprising:
a substrate having a first surface and a second surface;
a wavelength conversion element provided on the first surface; and
a heat sink provided on the second surface separately from the substrate,
wherein the heat sink includes a plate and a plurality of fins, the plate is in surface contact with the second surface of the substrate, and an outer diameter of the plurality of fins is smaller than an outer diameter of the substrate.

11. The wavelength conversion device according to claim 10, wherein a low heat resistance member that decreases heat resistance between the substrate and the heat sink is provided between the substrate and the heat sink.

12. The wavelength conversion device according to claim 10, further comprising a balance adjustment member provided in an outer circumferential portion of the plurality of fins.

13. The wavelength conversion device according to claim 10, wherein the heat sink is fixed to the substrate by a fixing member.

14. An illumination device comprising:
a light source configured to emit light in a first wavelength band; and
the wavelength conversion device according to claim 10 configured to receive the light in the first wavelength band and emit light in a second wavelength band.

15. The illumination device according to claim 14, wherein the light in the first wavelength band is made incident on the first surface, and the light in the second wavelength band is emitted from the first surface.

16. A projector comprising:
the illumination device according to claim 14;
a light modulation device configured to modulate, according to image information, illumination light emitted from the illumination device to thereby form image light; and
a projection optical system configured to project the image light.

* * * * *